US007502509B2

(12) United States Patent
Sheets et al.

(10) Patent No.: US 7,502,509 B2
(45) Date of Patent: Mar. 10, 2009

(54) SYSTEMS AND METHODS FOR DIGITAL PEN STROKE CORRECTION

(75) Inventors: Rodney L. Sheets, Salt Lake City, UT (US); Tuan Van Le, West Valley City, UT (US)

(73) Assignee: Velosum, Inc., Sandy, UT (US)

( * ) Notice: Subject to any disclaimer, the term of this patent is extended or adjusted under 35 U.S.C. 154(b) by 0 days.

(21) Appl. No.: 11/747,401

(22) Filed: May 11, 2007

(65) Prior Publication Data

US 2007/0263946 A1      Nov. 15, 2007

Related U.S. Application Data

(60) Provisional application No. 60/799,668, filed on May 12, 2006.

(51) Int. Cl.
*G06K 9/18* (2006.01)
*G06F 3/033* (2006.01)

(52) U.S. Cl. .................. 382/186; 345/179; 715/863

(58) Field of Classification Search ......... 382/181–189; 345/156–184; 715/863
See application file for complete search history.

(56) References Cited

U.S. PATENT DOCUMENTS

| | | | | |
|---|---|---|---|---|
| 6,118,437 A * | 9/2000 | Fleck et al. | .................. | 345/179 |
| 6,595,918 B2 | 7/2003 | Gopinathan et al. | | |
| 6,690,364 B1 * | 2/2004 | Webb | .................. | 345/173 |
| 6,698,660 B2 | 3/2004 | Fåhraeus et al. | | |
| 6,878,062 B2 | 4/2005 | Björklund et al. | | |
| 6,915,281 B2 | 7/2005 | Coffy et al. | | |
| 6,985,747 B2 | 1/2006 | Chithambaram | | |
| 6,999,622 B2 * | 2/2006 | Komatsu | .................... | 382/202 |
| 7,089,308 B2 | 8/2006 | Fransson et al. | | |
| 7,094,977 B2 | 8/2006 | Ericson et al. | | |

(Continued)

FOREIGN PATENT DOCUMENTS

EP      0 987 047 A2      3/1999

(Continued)

OTHER PUBLICATIONS

Accenture, "Points of View: Digital Pen and Paper," Oct. 2003, printed Oct. 26, 2006, pp. 1-4, http://www.accenture.com/Global/Services/Accenture_Technology_Labs/R_and_I/PointsPaper.htm.

(Continued)

*Primary Examiner*—Aaron W Carter
(74) *Attorney, Agent, or Firm*—Kory D. Christensen; Stoel Rives LLP (57) ABSTRACT

Systems and methods are provided for correcting digital pen strokes written on a paper form using a digital pen. In one embodiment, a stroke collection file includes sets of coordinates corresponding to respective pen strokes written on the paper form including a mistake stroke that a user of the pen desires to correct and a removal stroke written through the mistake stroke using the digital pen. In one embodiment, the removal stroke includes a horizontal zigzag pattern having at least one horizontal extend further to the left and further to the right of the mistake stroke. In one embodiment, coordinates corresponding to the mistake stroke and the removal stroke are deleted from the stroke collection file. The stroke collection file may also include coordinates for a third pen stroke intended to replace the mistake stroke. One embodiment includes rendering an image of the paper form and the third pen stroke.

19 Claims, 8 Drawing Sheets

U.S. PATENT DOCUMENTS

| | | | |
|---|---|---|---|
| 7,110,576 | B2 | 9/2006 | Norris, Jr. et al. |
| 7,113,178 | B1* | 9/2006 | Webb .......................... 345/173 |
| 7,148,883 | B2* | 12/2006 | Komatsu .................... 345/182 |
| 2002/0168107 | A1* | 11/2002 | Tang et al. .................. 382/187 |
| 2002/0196978 | A1* | 12/2002 | Hawkins ..................... 382/189 |
| 2003/0125981 | A1 | 7/2003 | Pazos |
| 2003/0165048 | A1 | 9/2003 | Bamji et al. |
| 2003/0179201 | A1* | 9/2003 | Thacker ...................... 345/441 |
| 2003/0220835 | A1 | 11/2003 | Barnes, Jr. |
| 2004/0046742 | A1 | 3/2004 | Johnson |
| 2004/0085301 | A1* | 5/2004 | Furukawa et al. ........... 345/179 |
| 2004/0196256 | A1* | 10/2004 | Wobbrock et al. .......... 345/156 |
| 2005/0114773 | A1* | 5/2005 | Thacker ...................... 715/541 |
| 2005/0249415 | A1* | 11/2005 | Bartolome .................. 382/187 |
| 2006/0028457 | A1* | 2/2006 | Burns .......................... 345/179 |
| 2006/0125805 | A1 | 6/2006 | Marggraff |
| 2006/0159345 | A1 | 7/2006 | Clary et al. |
| 2006/0183505 | A1 | 8/2006 | Willrich |
| 2006/0221383 | A1 | 10/2006 | Katsurabayashi |
| 2006/0233441 | A1* | 10/2006 | Clary .......................... 382/187 |
| 2006/0235611 | A1 | 10/2006 | Deaton et al. |
| 2006/0235741 | A1 | 10/2006 | Deaton et al. |
| 2006/0267965 | A1 | 11/2006 | Clary |
| 2007/0086654 | A1* | 4/2007 | James ......................... 382/186 |

OTHER PUBLICATIONS

Logitech IO Digital Writing System, "Digital Pens Bring Police Online," 2004, 3 pgs., www.logitechio.com/iobusiness.

Wiltshire Police News Article, "Wiltshire Police is world's first force to put 'digital pen to paper'", Jun. 16, 2004, prined Oct. 25, 2006, pgs. 1-4, http://www.wiltshire.police.uk/news/newsview.asp?id=454.

"HP Announces Secure, Mobile Law Enforcement Solutions at California Police Chiefs Association Conference," Feb. 8, 2005, printed Oct. 25, 2006, pgs. 1-3, http://www.hp.com/hpinfo/newsroom/press/2005/050208a.html, Sacramento, California.

Anoto Business Case, "Police save crucial time with digital pen and paper solution," printed Oct. 25, 2006, 3 pgs., http://partner.anoto.com/cldoc/15829.htm.

Case Study: Dotforms Notes, "dotforms notes: e-letter for the better!" by Diagramm Halbach GmbH & Co. KG, Schwerte, Germany, Feb. 2007, 2 pgs., www.halbach.com/dotforms.

Lozano, Narcis, et al., "Abstracting Pen Interfaces into Paper Interface Architecture," 2005, pgs. 37-41, Department of Computer, Information and Communication Sciences, Tokyo University of Agriculture and Technology, Fujisawa Human Interface.

"French Ambulance Data Goes Mobile," Jan. 2004, printed Oct. 22, 2007, 3 pgs., http://www.healthdatamanagement.com/HDMSearchResultsDetails.cfm?articleId=11733.

"In-Ambulance Remote Image Acquisition System Based on New Data-Compression Technology," Translation of the AIST press released on Oct. 21, 2004, printed Oct. 22, 2007, 7 pgs., National Institute of Advanced Industrial Science and Technology (AIST), http://www.aist.go.jp/aist_e/latest_research/2004/20041214/20041214.html.

Abstract, Gallego Jr., Hernandez-Solana A. et al., "Performance analysis of multiplexed medical data transmission for mobile emergency care over the UMTS channel," Mar. 2005, printed Oct. 22, 2007, 1 pg., IEEE Trans Inf Technol Biomed 9(1):13-22, Communications Technology Group, Aragon Institute for Engineering Research, Zaragoza 50018, Spain, http://www.ncbi.nlm.nih.gov/sites/entrez?cmd=Retrieve&db=PubMed&list_uids=15787003&dopt=AbstractPlus.

Sneiderman, MD, PHD, Charles A. et al., "Cellular Radio Telecommunication for Health Care: Benefits and Risks," Nov.-Dec. 2004, printed Oct. 22, 2007, 10 pgs., The Journal of the American Medical Informatics Association, 11(6):479-481, doi: 10.1197/jamia.M1532, http://www.pubmedcentral.nih.gov/articlerender.fcgi?artid=524627.

* cited by examiner

PARKING NOTICE VIOLATION
TO THE DRIVER AND REGISTERED OWNER  PE

LICENSE PLATE
⓪ ① ② ③ ④ ⑤ ⑥ ⑦ ⑧ ⑨
NP                                    CLR
Ⓐ Ⓑ Ⓒ Ⓓ Ⓔ Ⓕ Ⓖ Ⓗ Ⓘ
Ⓙ Ⓚ Ⓛ Ⓜ Ⓝ Ⓞ Ⓟ Ⓠ
Ⓡ Ⓢ Ⓣ Ⓤ Ⓥ Ⓦ Ⓧ Ⓨ Ⓩ

VEHICLE STATE
○-UT  ○-CA  ○-CO  ○-ID   *AZ*
○-NV  ○-TX  ✓-WY

VEHICLE MAKE
○-FORD  ○-CHEV   *Fiat*
○-HOND  ○-GM     *Porsche*
○-JEEP  ○-TOYT

OFFICER                AREA

DATE                   TIME

ADDRESS
LOCATION        DIR.      SUFFIX

STREET

VIOLATION(S)
○ EXPIRED METER         METER
  Ord. 12.56.150 - $10.00
○ EXPIRED REGISTRATION  EXP. DATE         ○ VC
  Ord. 12.56.040 - $20.00
○ PARKING TIME LIMIT
  Ord. 12.56.450 - $10.00   ○ PERMIT PARKING
○ NO PARKING              Ord. 12.56.310b - $20.00
  Ord. 12.56.460 - $20.00   ○ FIRE HYDRANT
○ FREIGHT ZONE            Ord. 12.56.4405 - $25.00
  Ord. 12.56.330 - $20.00   ○ ANGLE PARKING
○ AIRPORT PARKING         Ord. 12.56.110 - $17.00
  Ord. 12.56.250 - $17.00   ○ PASSENGER ZONE
                              Ord. 12.56.380 - $20.00
12. [ ]  6. [            ]  [                    ]

REMARKS
                                              SEND
○ VIN

SYSTEMS AND METHODS FOR DIGITAL PEN STROKE CORRECTION

RELATED APPLICATION

This application claims the benefit under 35 U.S.C. § 119 (e) of U.S. Provisional Application No. 60/799,668, filed May 12, 2006, which is hereby incorporated by reference herein in its entirety.

TECHNICAL FIELD

This disclosure relates to electronically filling out a paper form using a digital pen. More specifically, this disclosure relates to selectively removing and/or replacing data collected using a digital pen on a paper form.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION OF PREFERRED EMBODIMENTS

A user may write on a paper form using a digital pen that both marks the form and electronically records the marks in relation to various form fields. Thus, user selections made using the paper form and the digital pen may be automatically determined and an electronic image of the paper form may be generated that includes the user's marks. Digital pens usable with the disclosure herein include, for example, a digital pen available from Anoto AB of Stockholm, Sweden (also referred to herein as an "Anoto-type" pen), a digital pen available from Hitachi Maxell Ltd. of Tokyo, Japan, or a digital pen available from Logitech Inc. of Freemont, Calif. USA.

In one embodiment, a user may write characters such as numbers, letters or words in a particular field on a form. The digital pen stores data corresponding to pen strokes in a stroke collection file as the user writes on the form. The user may remove and/or replace pen stroke data from the stroke collection file, according to certain embodiments, by writing a horizontal removal stroke (e.g., a zigzag or scribble line) over mistaken characters on the form. In one embodiment, the removal stroke crosses over all of the characters that the user intends to remove from the stroke collection file. In addition, or in another embodiment, the removal stroke includes at least one substantially horizontal stroke pass that is wider than all of the characters that the user intends to remove from the stroke collection file.

After the user writes the scribble or removal stroke over the characters to remove from the stroke collection file, the user may write corrected characters in a space above or near the crossed out characters or directly over the crossed out characters. Like other pen strokes, pen stroke data corresponding to the corrected characters is added to the stroke collection file. The mistaken characters and removal strokes are then removed from the stroke collection file and the data in the stroke collection file is processed to, for example, render an electronic image of the form that does not include the mistaken characters or removal stroke, but which does include the corrected characters written by the user.

The embodiments of the disclosure will be best understood by reference to the drawings, wherein like elements are designated by like numerals throughout. In the following description, numerous specific details are provided for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Embodiments may also be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMS, magnetic or optical cards, solid-state memory devices, or other types of media/machine-readable medium suitable for storing electronic instructions.

Figure 1:
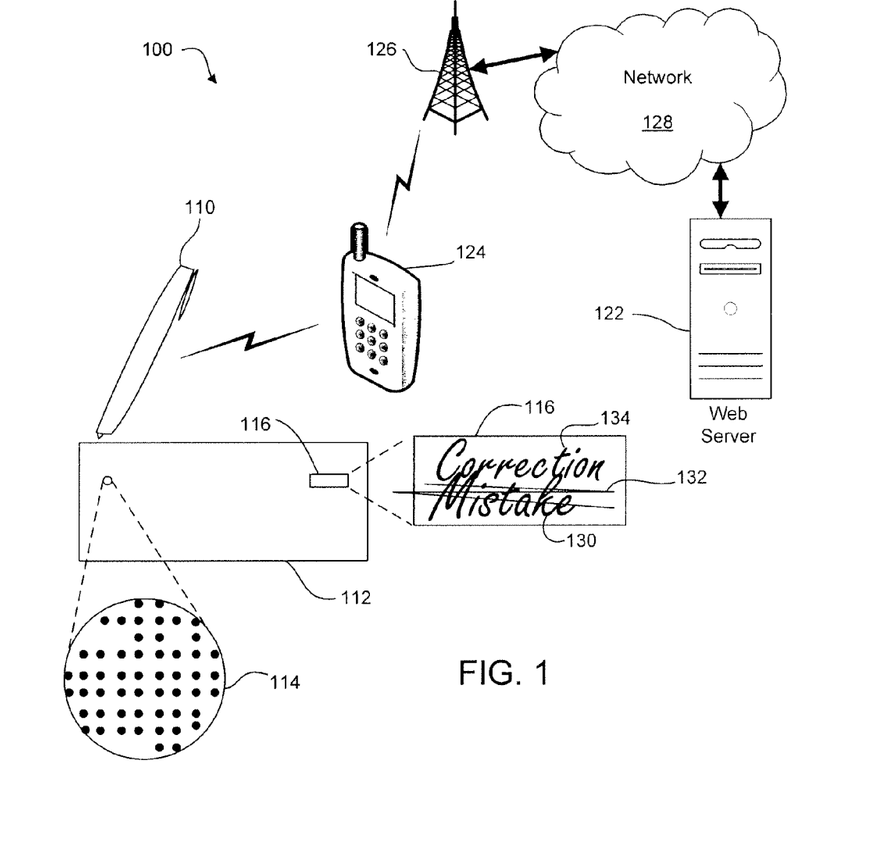
FIG. 1 is a block diagram of an example system for processing data received from a digital pen according to one embodiment.

FIG. 1 is a block diagram of an example system 100 for processing data received from a digital pen 110 according to one embodiment. The digital pen 110 is configured to write on a paper form 112 and to electronically capture pen strokes in relation to a position-coding pattern 114 on a writing surface of the form 112. As discussed above, the digital pen 110 may include an Anoto-type pen. Thus, although not shown, the digital pen 110 may include a ball point tip, an ink cartridge, a camera with a lens that is directed toward the ball point tip, a pressure sensitive sensor that activates when pressure is applied to the ball point tip, a processor, a memory device, a communication device, and a power source. However, an artisan will recognize from the disclosure herein that other types of digital pens known in the art may also be used.

In one embodiment, a user may use the digital pen 110 to make pen strokes (e.g., in ink) on the form 112. The digital pen 110 determines the location of the pen strokes on the form 112 relative to the position-coding pattern 114 by analyzing the position-coding pattern 114 as pressure is applied to the ball point tip. Thus, each pen stroke is associated with a series of coordinates (x(t), y(t)) in, for example, a Cartesian coordinate system defined by the position-coding pattern 114. Here, x(t) corresponds to a unique location in the position-coding pattern 114 along an x-axis at a particular time during the stroke. Similarly, y(t) corresponds to a unique location in the position-coding pattern 114 along a y-axis at a particular time during the stroke.

In one embodiment, the form 112 includes one or more predetermined form fields 116 that a user may mark using the digital pen 110 to enter data or make a particular selection. The field 116 may be preprinted on the form 112 at a predetermined location with respect to the position-coding pattern 114. Thus, the position of a pen stroke relative to the position-coding pattern 114 may be used to determine if the user has marked a location within an area defined by the field 116.

In the example shown in FIG. 1, the field 116 is enlarged to illustrate a plurality of strokes written by the user using the digital pen 110. The strokes include mistake characters 130 (the handwritten word "Mistake") and a removal stroke 132 written over the mistake characters 130. In this example, the removal stroke 132 intersects each of the mistake characters 130 and includes three segments that are wider than the word "Mistake." The strokes in the field 116 also include corrected characters 134 (the handwritten word "Correction") written in a space above the mistake characters 130. Although not required, in this example a portion of the corrected characters 134 intersect the mistake characters 130. As discussed below, the corrected characters 134 may also be written directly over the mistake characters 130.

Data for each stroke collected by the digital pen 110 may be stored in a stroke collection file that is communicated to a web server 122 through, for example, a user's cellular phone 124, a wireless communication system 126, and a network 128 such as the Internet or a local area network (LAN). In one embodiment, the digital pen 110 transmits data to the cellular phone 124 using Bluetooth®. In addition, or in another embodiment, the data may be retrieved from the digital pen 110 through a cable or docking station.

Figure 2:
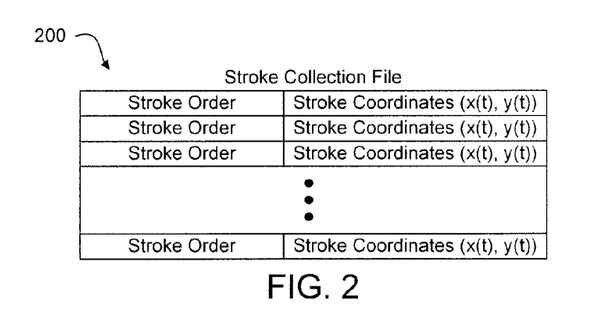
FIG. 2 is a block diagram of a data structure for a stroke collection file according to one embodiment.

FIG. 2 is a block diagram of a data structure for an example stroke collection file 200 according to one embodiment. As a user makes a pen stroke on the form 112 using the digital pen 110, the digital pen 110 assigns a stroke order (e.g., first, second, third, etc.) to the stroke relative to previous pen strokes, if any, made on the particular form 112. After determining the coordinates (x(t), y(t)) of the stroke in relation to the position-coding pattern 114, the digital pen 110 adds the stroke's stroke order and stroke coordinates to the stroke collection file 200. When the user indicates that the form is complete (e.g., by marking a predetermined location on the form 112), the digital pen 110 transmits the stroke collection file 200 to the cellular phone 124 for further processing and transmission to the web server 122.

FIGS. 3-6 are graphical representations of removal strokes 132 illustrated relative to respective mistake characters 130 according to certain embodiments. In the embodiment shown in FIG. 3, the removal stroke 132 includes four line segments and intersects all of the mistake characters 130 intended to be removed from the stroke collection file 200. The removal stroke 132 is horizontally wider than the entire word "Mistake" and extends both further left of the word and further right of the word. The removal stroke is also vertically taller than the word "Mistake" and extends both further below and further above the word.

Figure 3:
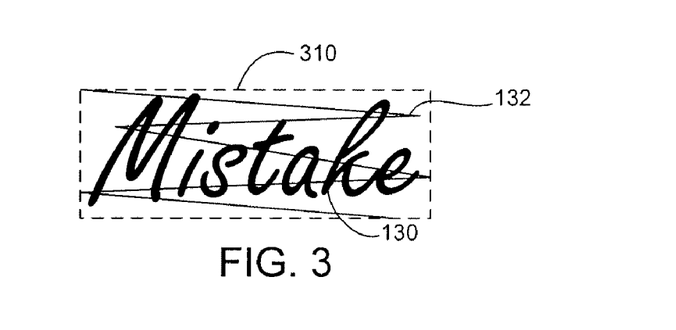
FIGS. 3-6 are graphical representations of removal strokes illustrated relative to respective mistake characters according to certain embodiments.

Thus, in the embodiment shown in FIG. 3, the removal stroke 132 may define a rectangular area 310 having a horizontal dimension extending from the removal stroke's leftmost x-coordinate to its right-most x-coordinate, and having a vertical dimension extending from the removal stroke's bottom-most y-coordinate to its top-most y-coordinate. In such an embodiment, all strokes within the rectangular area 310 that the user wrote prior to creating the removal stroke 132 are removed from the stroke collection file 200.

Figure 4:
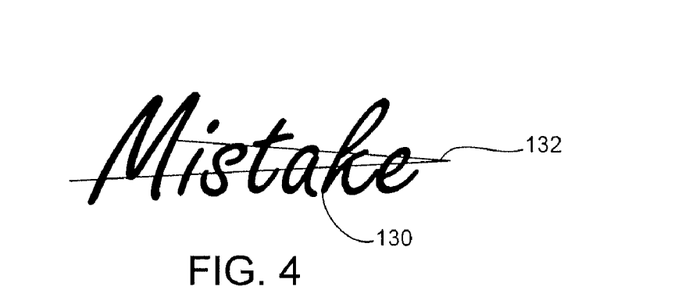

In the embodiment shown in FIG. 4, the removal stroke 132 includes two line segments and intersects all of the mistake characters 130 intended to be removed from the stroke collection file 200. The removal stroke 132 is wider than the entire word "Mistake." However, in this embodiment, the removal stroke 132 does not extend above or below all of the mistake characters 130. In such an embodiment, every stroke intersecting the removal stroke 132 that the user created prior to creating the removal stroke 130 is removed from the stroke collection file.

Figure 5:
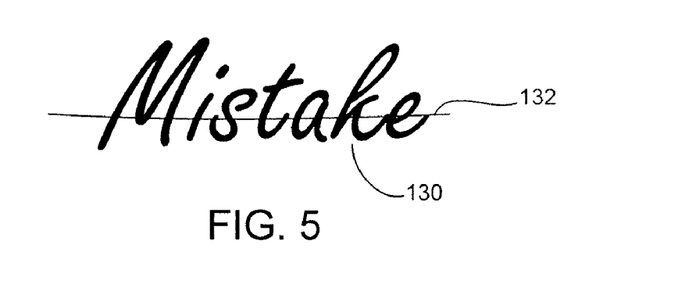

In the embodiment shown in FIG. 5, the removal stroke 132 includes a single line segment that intersects all of the mistake characters 130 intended to be removed from the stroke collection file 200. The removal stroke 132 wider than the entire word "Mistake." Again, in such an embodiment, every stroke intersecting the removal stroke 132 that the user created prior to creating the removal stroke 130 is removed from the stroke collection file.

Figure 6:
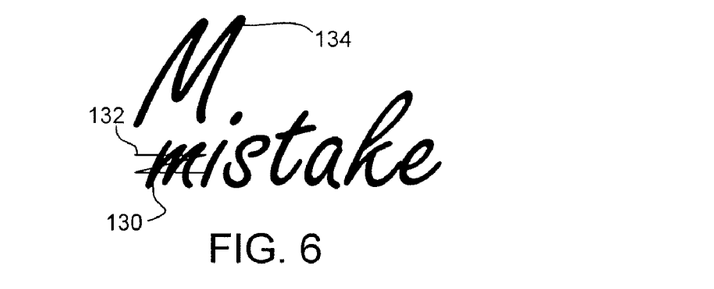

In the embodiment shown in FIG. 6, the removal stroke 132 is drawn through a single removal character 130 (the lower-case letter "m"). The removal stroke 132 intersects both the letter "m" and the letter "i". The removal stroke 132 extends both further left of the letter "m" and further right of the letter "m". However, the removal stroke 132 does not extend beyond the left and right sides of the letter "i". Thus, the letter "m" is removed from the stroke collection file 200 and the remaining characters in the word "mistake" are not removed from the stroke collection file 200. As shown in FIG. 6, after writing the removal stroke 132, the user may write a corrected character 134 (a capitol letter "M") in a space above or near the mistake character 130.

As discussed above, corrected characters 134 may also be written directly over mistake characters 130 and removal strokes 132. For example, FIG. 7A graphically represents a process 700 for replacing a first handwritten character 710 by drawing a removal stroke 712 through the first character 710, and writing a second character 714 directly over the first character 710 and the removal stroke 712.

Figure 7A:
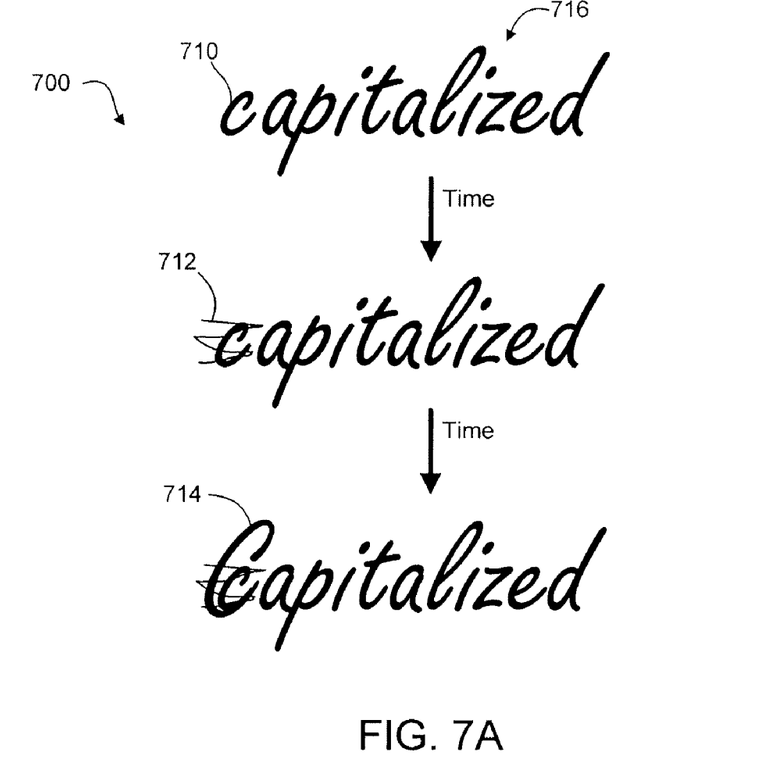
FIG. 7A graphically represents a process for replacing a first handwritten character by drawing a removal stroke through the first character and writing a second character directly over the first character and the removal stroke.
Figure 7B:
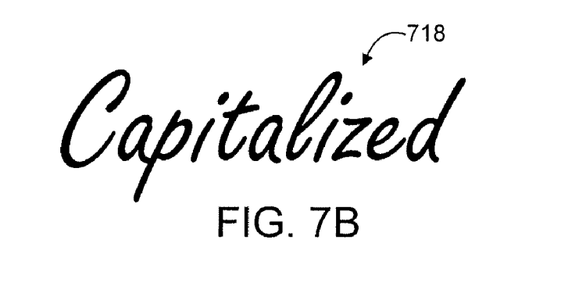
FIG. 7B graphically illustrates a rendered image of a word including the second character shown in FIG. 7A according to one embodiment.

In the example shown in FIG. 7A, a user writes a word 716 ("capitalized") using a digital pen. Later, upon realizing that the user failed to capitalize the first character 710 ("c") of the word 716, the user draws the removal stroke 712 through the first character 710 using the digital pen. Then, the user writes the second character (a capitalized letter "C") directly over the first character 710 and the removal stroke 712 in a desired location with respect to the remainder of the word 716. Thus, when the pen strokes corresponding to the first character 710 and the removal stroke 712 are removed from the stroke collection file, the coordinates of the second character 714 with respect to the remainder of the word 716 are such that a rendered image 718 of the word 716 (as shown in FIG. 7B) is displayed with the second character 714 in the desired position as if the word 716 had originally been written correctly.

Figure 8:
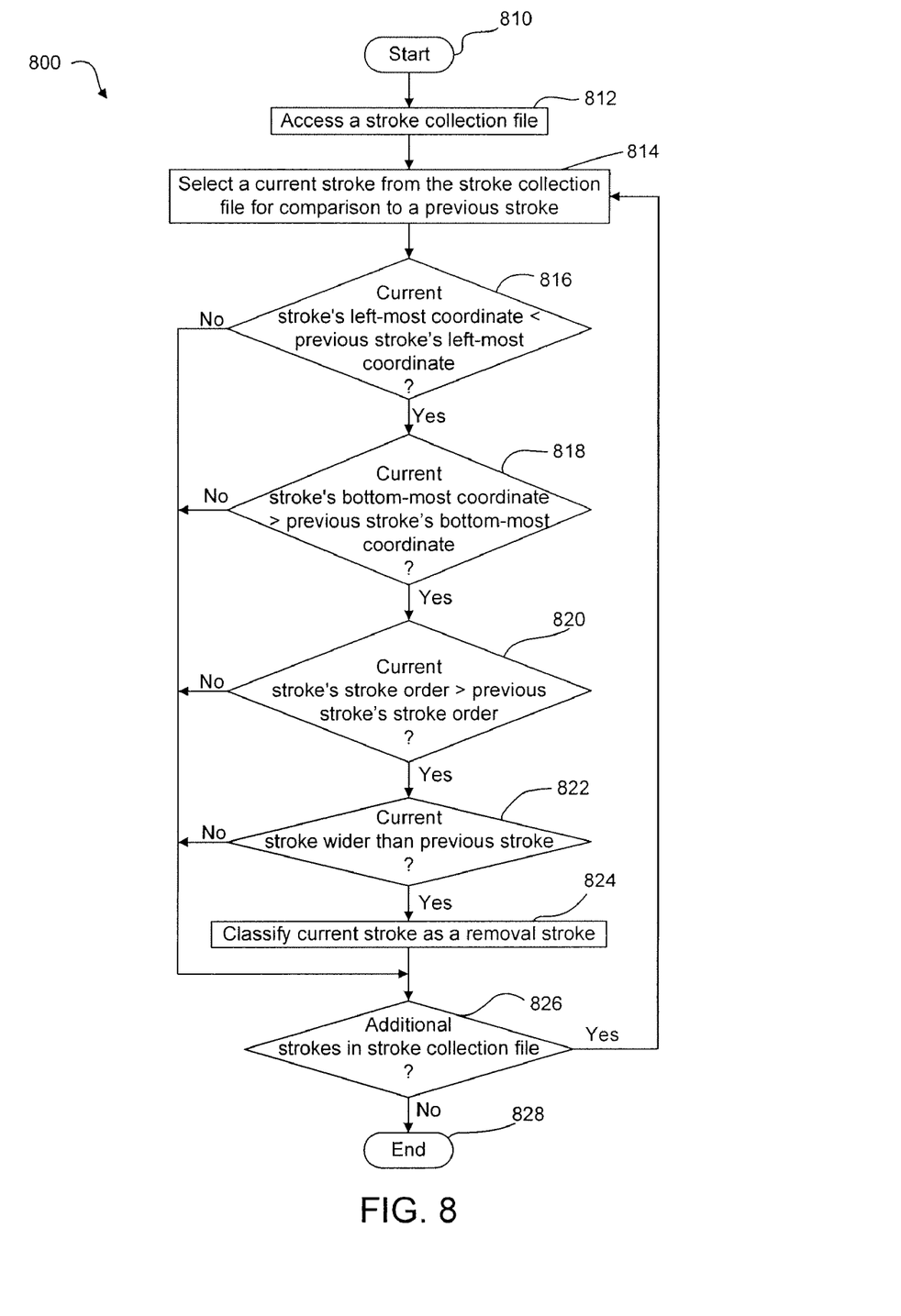
FIG. 8 is a flowchart of a process for identifying removal strokes written with a digital pen according to one embodiment.

FIG. 8 is a flowchart of a process 800 for identifying removal strokes written with a digital pen according to one embodiment. After starting 810, the process 800 includes accessing 812 a stroke collection file and selecting 814 a current stroke from the stroke collection file for comparison to a previous stroke in the stroke collection file. In one embodiment, the current stroke is compared to each previous stroke in the stroke collection file, as discussed below, to determine whether the current stroke is a removal stroke.

The process 800 also includes querying 816 whether the current stroke's left-most coordinate is less than the previous stroke's left-most coordinate and querying 818 whether the current stroke's bottom-most coordinate is greater than the previous stroke's bottom-most coordinate. Comparison of the bottom-most coordinate (e.g., a y-coordinate or vertical comparison) allows the process 800 to accommodate multi-line fields. The process 800 further includes querying 820 whether the current stroke's stroke order is greater than the previous stroke's stroke order (e.g., the current stroke was written or added to the stroke collection file after the previous stroke was written or added to the stroke collection file), and querying 822 whether the current stroke is wider than the previous stroke (e.g., the difference between the current stroke's left-most x-coordinate and right-most x-coordinate is greater than is greater than the difference between the previous stroke's left-most x-coordinate and right-most x-coordinate).

If the answer to each of the above queries 816, 818, 820, 822 is yes (for each previous stroke as compared to the current stroke), then the process 800 includes classifying 824 the current stroke as a removal stroke. If any answer is no, the current stroke is not a removal stroke. The process 800 may also include querying 826 whether there are additional strokes in the stroke collection file. If there are additional strokes in the stroke collection file, the process 800 selects 814 a new current stroke from the stroke collection file and repeats the queries 816, 818, 820, 822 to determine if the new current stroke is a removal stroke. If there are no additional strokes in the stroke collection file, the process 800 ends 828.

Figure 9:
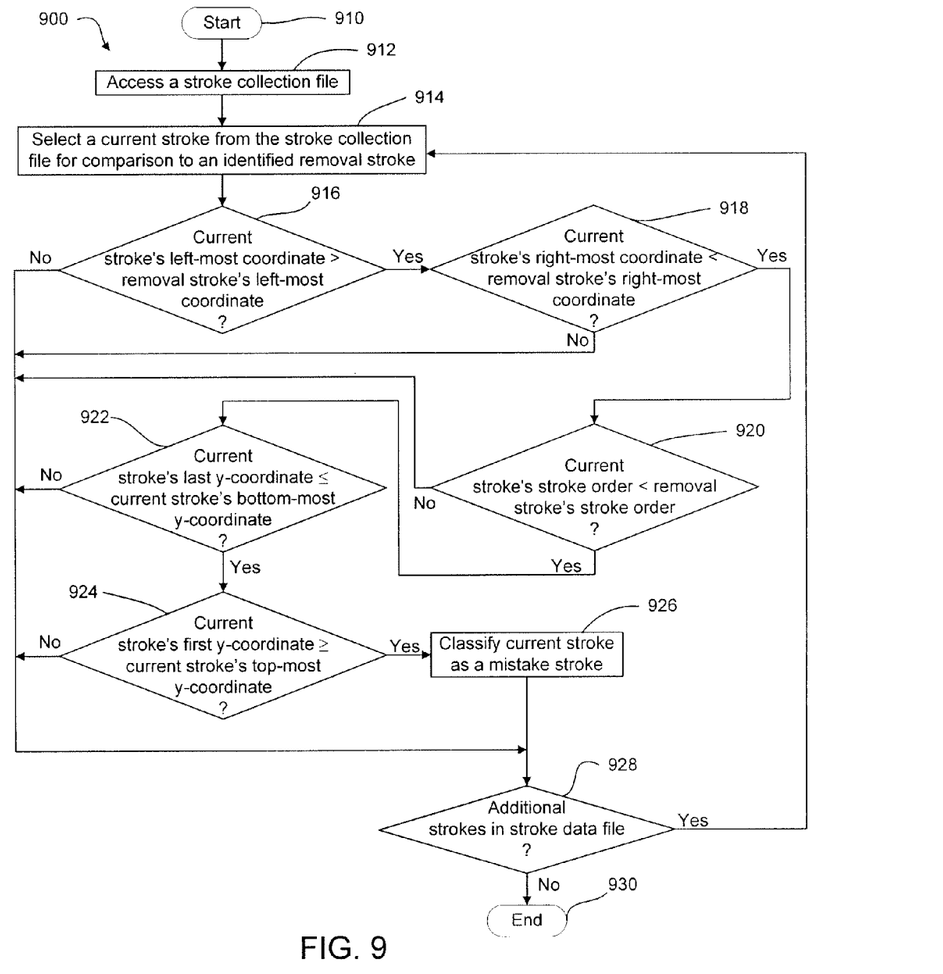
FIG. 9 is a flowchart of a process for identifying a mistake stroke according to one embodiment.

FIG. 9 is a flowchart of a process 900 for identifying a mistake stroke according to one embodiment. After starting 910, the process 900 includes accessing 912 a stroke collection file and selecting 914 a current stroke from the stroke collection file for comparison to an identified removal stroke in the stroke collection file.

The process 900 also includes querying 916 whether the current stroke's left-most coordinate is greater than the removal stroke's left-most coordinate, querying 918 whether the current stroke's right-most coordinate is less than the removal stroke's right-most coordinate, querying 920 whether the current stroke's stroke order is less than the removal stroke's stroke order (e.g., the current stroke was written or added to the stroke collection file before the removal stroke was written or added to the stroke collection file), querying 922 whether the current stroke's last y-coordinate is less than or equal to the current stroke's bottom-most y-coordinate, and querying 924 whether the current stroke's first y-coordinate is greater than or equal to the current stroke's top-most y-coordinate (e.g., to handle multi-line fields).

If the answer to each of the above queries 916, 918, 920, 922, 924 is yes, then the process 900 includes classifying 926 the current stroke as a mistake stroke. If any answer is no, the current stroke is not a mistake stroke. The process 900 may also include querying 928 whether there are additional strokes in the stroke collection file. If there are additional strokes in the stroke collection file, the process 900 selects 914 a new current stroke from the stroke collection file and repeats the queries 916, 918, 920, 922, 924 to determine if the new current stroke is a mistake stroke. If there are no additional strokes in the stroke collection file, the process 900 ends 930.

Figure 10:
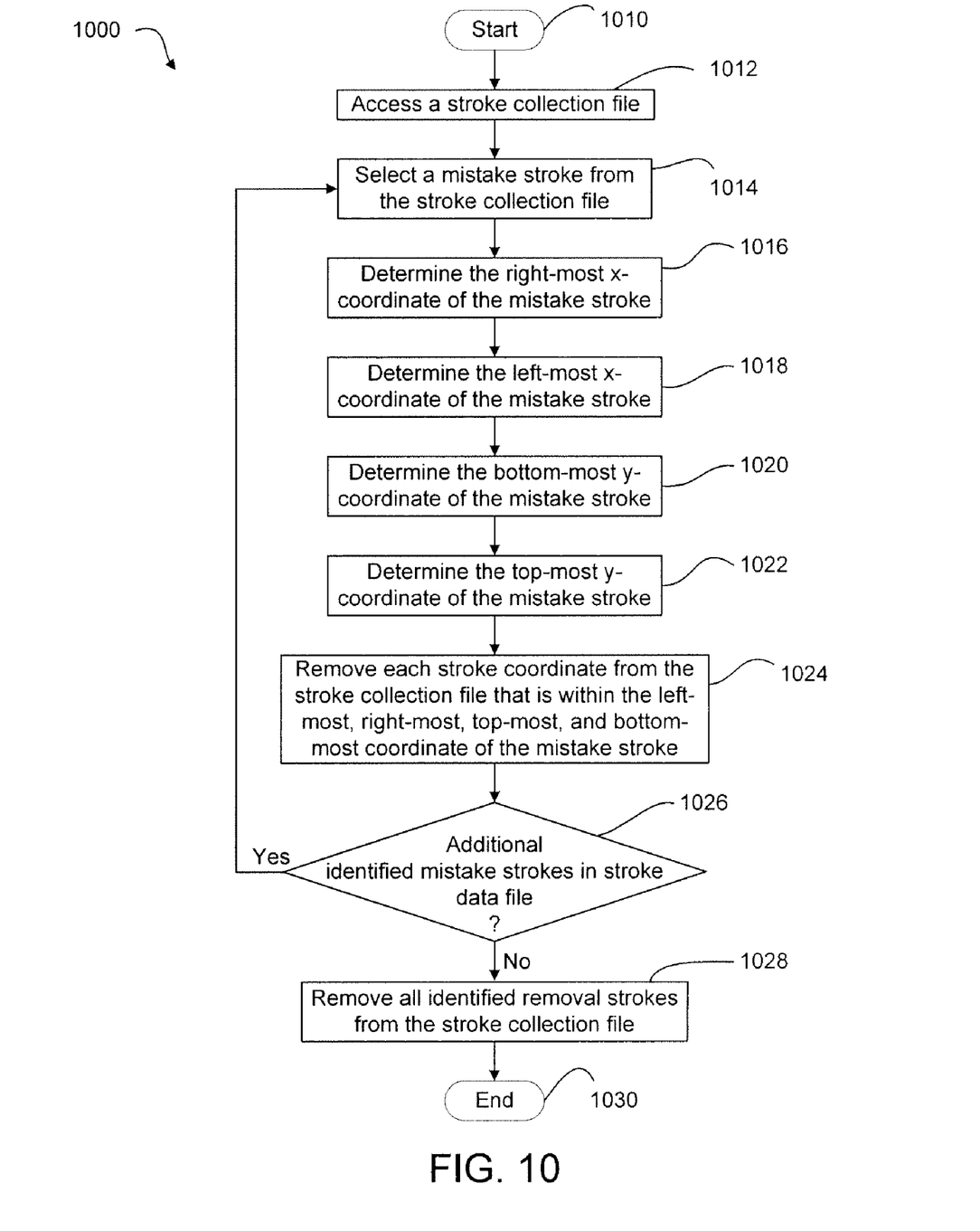
FIG. 10 is a flowchart of a process for removing mistake strokes from a stroke collection file according to one embodiment.

FIG. 10 is a flowchart of a process 1000 for removing mistake strokes from a stroke collection file according to one embodiment. After starting 1010, the process 1000 includes accessing 1012 a stroke collection file and selecting 1014 a mistake stroke from the stroke collection file. The process 1000 also includes determining 1016 the right-most x-coordinate of the mistake stroke, determining 1018 the left-most x-coordinate of the mistake stroke, determining 1020 the bottom-most y-coordinate of the mistake stroke, and determining 1022 the top-most y-coordinate of the mistake stroke. The process 1000 also includes removing 1024 each stroke coordinate from the stroke collection file that is within the left-most, right-most, top-most, and bottom-most coordinate of the mistake stroke.

The process 1000 may also include querying 1026 whether there are additional mistake strokes in the stroke collection file. If there are additional mistake strokes in the stroke collection file, the process 1000 selects 1014 a new mistake stroke from the stroke collection file for removal. If there are no additional mistake strokes in the stroke collection file, the process 1000 removes 1028 all identified removal strokes from the stroke collection file and ends 1030.

Figure 11A:
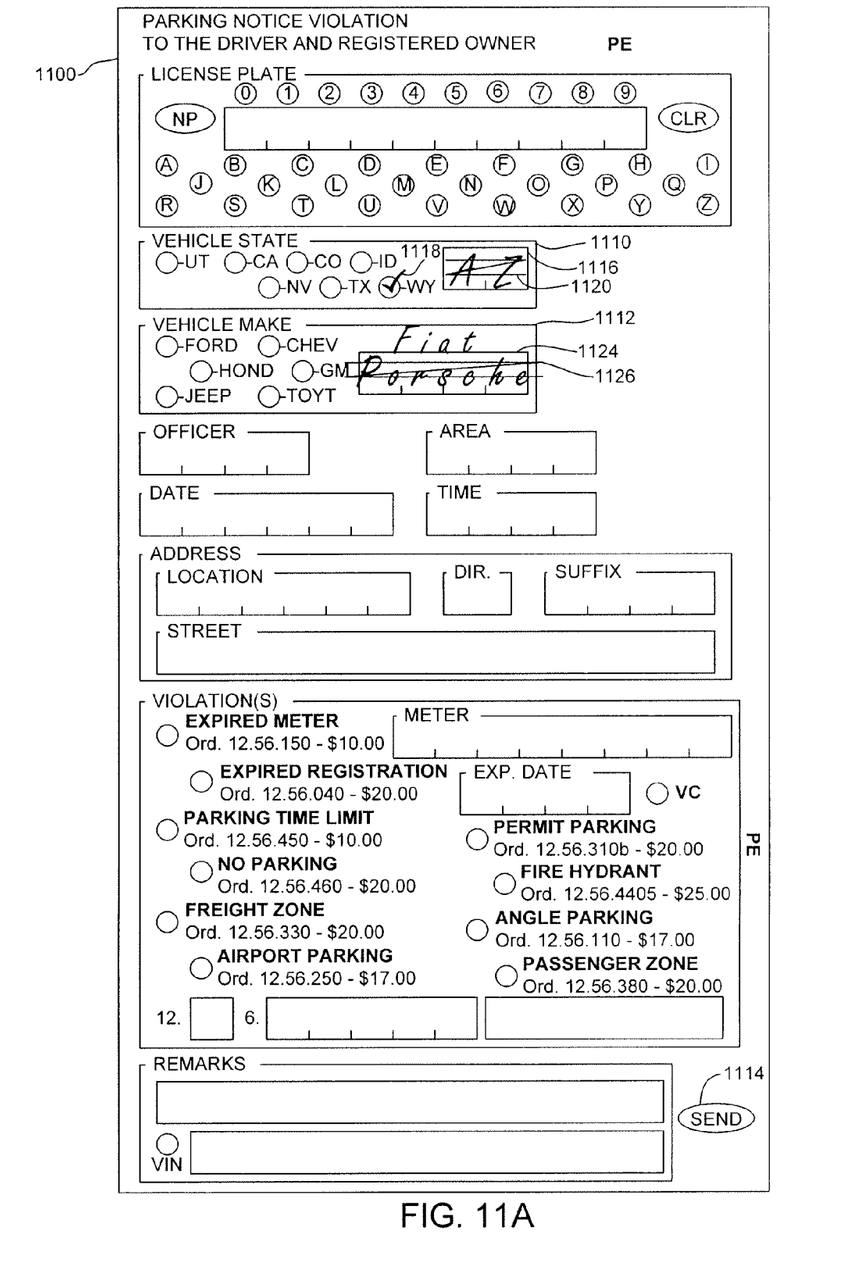
FIG. 11A graphically illustrates an example parking ticket including various fields where users may write characters according to one embodiment.

By way of example, FIG. 11A graphically illustrates an example parking ticket 1100 (Parking Notice Violation to the Driver and Registered Owner) with various fields 1110, 1112 where users may write characters (e.g., letters and/or numbers) according to one embodiment. In one embodiment, the parking ticket 1100 is a paper form including a position-coding pattern that is detectable by a digital pen, as discussed above. The parking ticket 1100 may be filled out by a user such as a police officer or parking enforcement official using the digital pen.

When the user is finished writing information on the parking ticket 1100, the user may write a pen stroke in or through a send field 1114, which instructs the digital pen to send the data it has collected to the user's cellular phone or other communication device. The user who wrote the ticket 1100 may then leave the paper copy of the parking ticket 1100 on a vehicle's windshield. The data collected by the digital pen may be sent to and automatically processed by a central web server that may recognize the handwriting thereon, enter field selections in a searchable database, and/or render an electronic image of the parking ticket 1100 with the user's pen strokes. The data may be used for violation enforcement and in automating a fine collection process.

In the example embodiment shown in FIG. 11A, a vehicle state field 1110 allows the user to specify a state that issued a license plate for a vehicle in violation of a parking ordinance. Using a digital pen, the user may select one of a plurality of predefined states by writing a mark in a circle (or other symbol) next to the state's name or abbreviation. In this example, the predefined states include Utah (UT), California (CA), Colorado (CO), Idaho (ID), Nevada (NV), Texas (TX), or Wyoming (WY). If the license plates were issued by a state other than one of the predefined states, the user may also write the abbreviation of the appropriate state within a text box 1116 in the vehicle state field 1110.

Figure 11B:
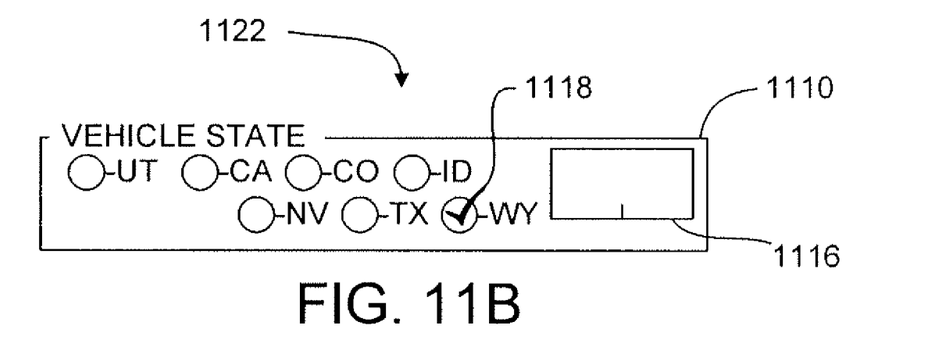
FIGS. 11B and 11C graphically illustrate rendered images of respective fields shown in FIG. 11A.

In this example, the user first wrote the letters "A" and "Z" in the text box 1116 using a digital pen to indicate that the state of Arizona issued a vehicle's license plate. The user then determined that the state of Wyoming actually issued the license plate. Thus, using the digital pen, the user subsequently wrote a checkmark 1118 in a circle labeled "WY" and crossed through the letters "A" and "Z" with a removal stroke 1120. Data corresponding to pen strokes for the letters "A" and "Z," the checkmark 118, and the removal stroke 1120 is added to the stroke collection file as the user makes the pen strokes. However, as discussed above, the letters "A" and "Z" and the removal stroke 1120 are later removed from the stroke collection file. Thus, a rendered image 1122 of the vehicle state field 1110 (as shown in FIG. 11B) includes the checkmark 1118, but it does not include the letters "A" and "Z" or the removal stroke 1120.

By way of another example, a vehicle make field 1112 shown in FIG. 11A allows the user to further identify the vehicle in violation of the parking ordinance by specifying the manufacturer of the vehicle. Using the digital pen, the user may select one of a plurality of predefined automobile manufacturers by writing a mark in a circle (or other symbol) next to the manufacturer's name or abbreviation. In this example, the predefined manufacturers include Ford (FORD), Chevrolet (CHEV), Honda (HOND), General Motors (GM), Jeep (JEEP), and Toyota (TOYT). If the vehicle was made by a manufacturer other than one of the predefined manufacturers, the user may also write the name or abbreviation of the appropriate manufacturer within a text box 1124 in the vehicle make field 1112.

Figure 11C:
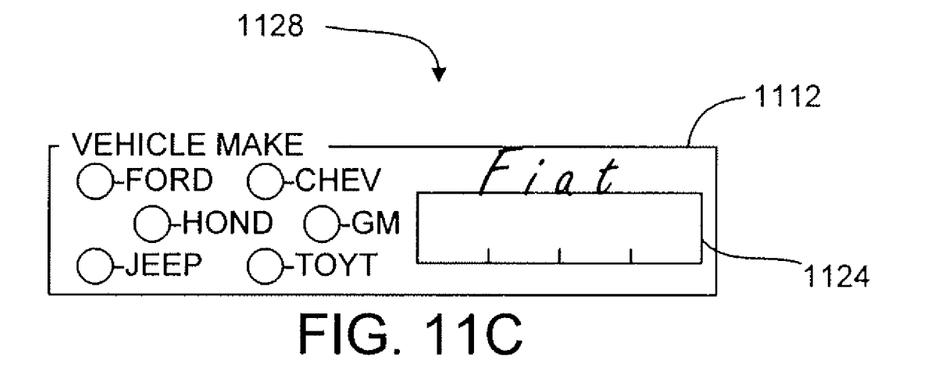

In this example, the user first wrote the word "Porsche" in the text box 1124 using a digital pen. The user then determined that the vehicle was actually manufactured by Fiat. Thus, using the digital pen, the user subsequently crossed through the word "Porsche" with a removal stroke 1126 and wrote the word "Fiat" in a space above the text box 1124. Data corresponding to pen strokes for the words "Porsche" and "Fiat" and the removal stroke 1126 is added to the stroke collection file. However, as discussed above, the word "Porsche" and the removal stroke 1126 are later removed from the stroke collection file. Thus, a rendered image 1128 of the vehicle make field 1112 (as shown in FIG. 11C) includes the word "Fiat," but it does not include the word "Porsche" or the removal stroke 1126.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A method for correcting digital pen strokes, the method comprising:
   using a computer to perform the follow steps:
   accessing a stroke collection file comprising data corresponding to a plurality of pen strokes written on a paper form using a digital pen;
   determining a first set of coordinates in the stroke collection file corresponding to a removal stroke, the removal stroke written on the paper form so as to identify a corresponding mistake stroke written on the paper form;
   determining a second set of coordinates in the stroke collection file corresponding to the mistake stroke;
   determining a third set of coordinates in the stroke collection file that corresponds to a correction stroke written on the paper form using the digital pen so as to intersect with the removal stroke; and
   removing the first set of coordinates and the second set of coordinates from the stroke collection file.

2. The method of claim 1, further comprising rendering an image of the paper form and the data in the stroke collection file after removing the first set of coordinates and the second set of coordinates from the stroke collection file, the image comprising:
   first indicia corresponding to a field printed on the paper form; and
   second indicia corresponding to the correction stroke as located in relation to the field printed on the paper form.

3. The method of claim 1, wherein the removal stroke comprises a zigzag pattern written through the mistake stroke on the paper form.

4. The method of claim 3, wherein the removal stroke comprises at least one substantially horizontal stroke that extends more to the left and more to the right of the mistake stroke.

5. The method of claim 3, wherein the removal stroke is written on the paper form using the digital pen after the mistake stroke is written on the paper form using the digital pen.

6. The method of claim 1, wherein removing the second set of coordinates from the stroke collection file comprises:
   determining a right-most x-coordinate of the second set of coordinates;
   determining a left-most x-coordinate of the second set of coordinates;
   determining a bottom-most y-coordinate of the second set of coordinates;
   determining a top-most y-coordinate of the second set of coordinates; and
   removing each stroke coordinate from the stroke collection file that is within the right-most x-coordinate, the left-most x-coordinate, the bottom-most y-coordinate and the top-most y-coordinate of the second set of coordinates.

7. A system for modifying digital pen strokes, the system comprising:
   a digital pen configured to write pen strokes on a paper form and to store corresponding stroke coordinates in a stroke collection file; and
   a processor configured to:
   determine a first set of coordinates in the stroke collection file corresponding to a first pen stroke, the first pen stroke written on the paper form so as to identify a corresponding second pen stroke written on the paper form, the second pen stroke being written before the first pen stroke;
   determine a second set of coordinates in the stroke collection file corresponding to the second pen stroke;
   determining a third set of coordinates in the stroke collection file corresponding to a third pen stroke written on the paper form using the digital pen so as to intersect with the first stroke; and
   remove the first set of coordinates and the second set of coordinates from the stroke collection file.

8. The system of claim 7, further comprising a wireless communication device configured to receive the stroke collection file from the digital pen and to provide the stroke collection file to the processor.

9. The system of claim 7, wherein the processor comprises a web-based server.

10. The system of claim 9, wherein the processor is further configured to render an image of the paper form and the data in the stroke collection file after removing the first set of coordinates and the second set of coordinates from the stroke collection file, the image comprising:

first indicia corresponding to a field printed on the paper form; and second indicia corresponding to the third stroke as located in relation to the field printed on the paper form.

11. The system of claim 7, wherein the first stroke comprises a zigzag pattern written through the second stroke on the paper form.

12. The system of claim 11, wherein the first stroke comprises at least one substantially horizontal stroke that extends more to the left and more to the right of the second stroke.

13. The system of claim 7, wherein removing the second set of coordinates from the stroke collection file comprises:

determining a right-most x-coordinate of the second set of coordinates;

determining a left-most x-coordinate of the second set of coordinates;

determining a bottom-most y-coordinate of the second set of coordinates;

determining a top-most y-coordinate of the second set of coordinates; and removing each stroke coordinate from the stroke collection file that is within the right-most x-coordinate, the left-most x-coordinate, the bottom-most y-coordinate and the top-most y-coordinate of the second set of coordinates.

14. A computer-readable medium comprising computer executable instructions for performing a method for correcting digital pen strokes, the method comprising:

accessing a stroke collection file comprising data corresponding to a plurality of pen strokes written on a paper form using a digital pen;

determining a first set of coordinates in the stroke collection file corresponding to a removal stroke, the removal stroke written on the paper form so as to identify a corresponding mistake stroke written on the paper form;

18termining a second set of coordinates in the stroke collection file corresponding to the mistake stroke;

determining a third set of coordinates in the stroke collection file corresponding to a correction stroke written on the paper form using the digital pen so as to intersect with the removal stroke; and removing the first set of coordinates and the second set of coordinates from the stroke collection file.

15. The computer-readable medium of claim 14, wherein the method further comprises rendering an image of the paper form and the data in the stroke collection file after removing the first set of coordinates and the second set of coordinates from the stroke collection file, the image comprising:

first indicia corresponding to a field printed on the paper form; and second indicia corresponding to the correction stroke as located in relation to the field printed on the paper form.

16. The computer-readable medium of claim 14, wherein the removal stroke comprises a zigzag pattern written through the mistake stroke on the paper form.

17. The computer-readable medium of claim 16, wherein the removal stroke comprises at least one substantially horizontal stroke that extends more to the left and more to the right of the mistake stroke.

18. The computer-readable medium of claim 16, wherein the removal stroke is written on the paper form using the digital pen after the mistake stroke is written on the paper form using the digital pen.

19. The computer-readable medium of claim 14, wherein removing the second set of coordinates from the stroke collection file comprises:

determining a right-most x-coordinate of the second set of coordinates;

determining a left-most x-coordinate of the second set of coordinates;

determining a bottom-most y-coordinate of the second set of coordinates;

determining a top-most y-coordinate of the second set of coordinates; and removing each stroke coordinate from the stroke collection file that is within the right-most x-coordinate, the left-most x-coordinate, the bottom-most y-coordinate and the top-most y-coordinate of the second set of coordinates.

* * * * *